United States Patent [19]

McKiel, Jr.

[11] Patent Number: 5,133,011
[45] Date of Patent: Jul. 21, 1992

[54] METHOD AND APPARATUS FOR LINEAR VOCAL CONTROL OF CURSOR POSITION

[75] Inventor: Frank A. McKiel, Jr., Dallas, Tex.

[73] Assignee: International Business Machines Corporation, Armonk, N.Y.

[21] Appl. No.: 633,882

[22] Filed: Dec. 26, 1990

[51] Int. Cl.$^5$ .................... G10L 5/00; G09G 1/00
[52] U.S. Cl. .................... 381/43; 395/2; 381/48
[58] Field of Search ................ 381/41–43, 381/48; 395/2

[56] References Cited

U.S. PATENT DOCUMENTS

4,799,209 10/1988 Stapleford .................... 395/2
5,068,645 11/1991 Drumm ........................ 340/710

Primary Examiner—Emanuel S. Kemeny
Attorney, Agent, or Firm—Andrew J. Dillon

[57] ABSTRACT

A method and apparatus for linear vocal control of cursor position within a computer display system. A microphone is utilized in conjunction with a computer system to detect vocal utterances and each vocal utterance is then coupled to an analysis circuit to detect voiced and unvoiced vocal utterances. Variations in the pitch of each voiced vocal utterance and the virtual frequency of each unvoiced vocal utterance are then utilized to linearly vary the position of a cursor in the computer display system in two axes independently. In a depicted embodiment of the present invention the analysis circuit includes a short delay to ensure that a valid control signal has occurred. Thereafter, increases or decreases in pitch or virtual frequency from an initial value are utilized to initiate movement by the cursor in a positive or negative direction in the two axes. Cursor motion will persist until pitch or virtual frequency return to an initial value or until the utterance ceases. In one embodiment of the present invention the appearance of the cursor is graphically altered to the indicate the presence of a valid control signal.

12 Claims, 2 Drawing Sheets

METHOD AND APPARATUS FOR LINEAR VOCAL CONTROL OF CURSOR POSITION

BACKGROUND OF THE INVENTION

1. Technical Field

The present invention relates in general to improved data processing systems and in particular to a method and apparatus for cursor control within a data processing system. Still more particularly, the present invention relates to a method and apparatus for the linear vocal control of cursor position in a data processing system.

2. Description of the Related Art

Voice control of various mechanical and/or electrical devices is well known in the art. In hand occupied environments or among the physically challenged, the accurate control of such devices is a much desired technology.

Known control devices for electrical appliances range from simple power relays which apply or remove power from an appliance in response to the sound of a whistle or the clapping of hands, to sophisticated computer control devices which permit complex commands to be entered verbally. For example, telephone systems exist which automatically dial an outgoing telephone call in response to a verbal command identifying a desired individual.

Modern computer systems often utilize a so-called "Graphic User Interface" or "GUI" to permit computer users to access computer applications and manipulate computer files in an intrinsically natural manner by graphically designating graphic representations, or icons, and manipulating those icons in a manner well known in the art. Such graphic designation typically takes place utilizing a graphic pointing device, such as a mouse or light pen, to relocate a "cursor" which selects the desired computer application.

Vocal control of a cursor has been attempted in certain state-of-the-art computer systems by recognizing certain command speech utterances such as "UP," "DOWN," "LEFT," "RIGHT," and "STOP." This approach has proven cumbersome for fine cursor control due to the number of iterations which are typically necessary to position a cursor at a desired location. Other systems permit gross positioning of a cursor by mapping the cursor to various regions of a display screen in response to selected vowel sounds; however, as above, this system is cumbersome for fine cursor positioning.

Therefore, it should be apparent that a need exists for a system which permits the accurate control of cursor position in a computer system by verbalized commands.

SUMMARY OF THE INVENTION

It is therefore one object of the present invention to provide an improved computer system.

It is another object of the present invention to provide an improved method and apparatus for cursor control within a computer system.

It is yet another object of the present invention to provide an improved method and apparatus for linear vocal cursor control within a computer system.

The foregoing objects are achieved as is now described. A microphone is utilized in conjunction with a computer system to detect vocal utterances and each vocal utterance is then coupled to an analysis circuit to detect voiced and unvoiced vocal utterances. Variations in the pitch of each voiced vocal utterance and the virtual frequency of each unvoiced vocal utterance are then utilized to linearly vary the position of a cursor in the computer display system in two axes independently. In a depicted embodiment of the present invention the analysis circuit includes a short delay to ensure that a valid control signal has occurred. Thereafter, increases or decreases in pitch or virtual frequency from an initial value are utilized to initiate movement by the cursor in a positive or negative direction in the two axes. Cursor motion will persist until pitch or virtual frequency return to an initial value or until the utterance ceases. In one embodiment of the present invention the appearance of the cursor is graphically altered to indicate the presence of a valid control signal.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
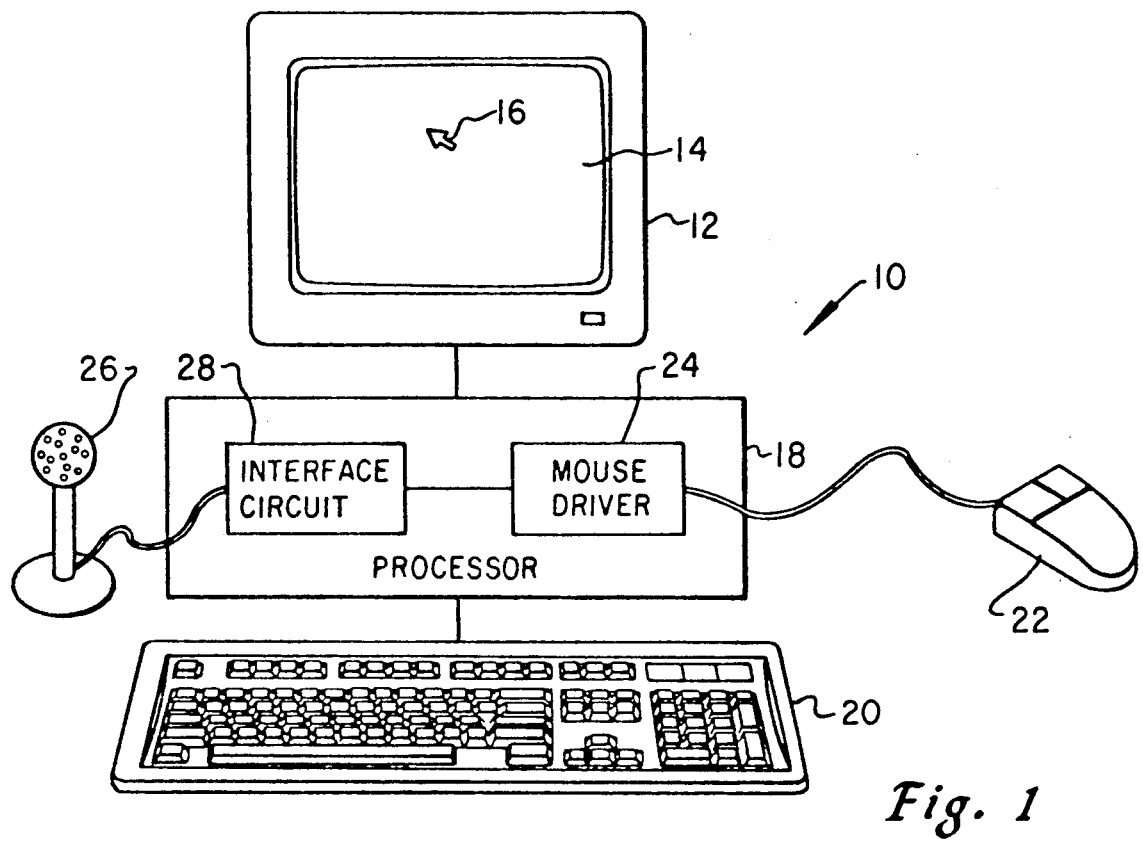
FIG. 1 is a partially schematic, partially pictorial representation of a computer system which may be utilized to implement the method and apparatus of the present invention.

With reference now to the figures and in particular with reference to FIG. 1, there is depicted a partially schematic, partially pictorial representation of a computer system 10 which may be utilized to implement the method and apparatus of the present invention. As illustrated, computer system 10 includes a display device 12 which is utilized to provide a display screen 14 in a manner well known in the art. Depicted within display screen 14 is cursor 16. Cursor 16 is depicted in an arrow shaped embodiment; however, those skilled in the art will appreciate that cursors may be depicted in multiple different shapes. Coupled to display device 12 is processor 18. Processor 18 includes the central processing unit for computer system 10 and is also coupled to keyboard 20. Keyboard 20 may be utilized, in a manner well known to those skilled in the computer art, to permit the computer user to key in various command sequences and for data entry to permit interaction with various computer applications.

Those skilled in the art, will, upon reference to this specification, appreciate that computer system 10 may be implemented utilizing any personal computer system well known in the prior art such as the PS/2 IBM Personal Computer manufactured by International Business Machines Corporation of Armonk, N.Y. Coupled to processor 18 is a graphic pointing device 22. In the depicted embodiment of the present invention, graphic pointing device 22 comprises a mouse. Graphic pointing device 22 is then coupled to mouse driver 24 within processor 18 in a manner well known in the computer art. Of course, mouse driver 24 may be implemented in either hardware or software.

In accordance with an important feature of the present invention, a microphone 26 is also coupled to processor 18. Microphone 26 is utilized, in accordance with the depicted embodiment of the present invention, to permit vocal utterances to be utilized to control the positioning of cursor 16 within display screen 14 in a manner which will be depicted in greater detail herein. The analog output of microphone 26 is, in accordance with the illustrated embodiment of the present invention, coupled to interface circuit 28. Interface circuit 28 is preferably an interface circuit such as the one disclosed in greater detail with respect to FIG. 2 and which is utilized to convert vocal utterances of the type disclosed herein to control signals which are then coupled to mouse driver 24 and utilized to linearly relocate cursor 16 within display screen 14.

Rather than utilize spoken commands such as "UP," "RIGHT," "STOP," etc., the method and apparatus of the present invention utilizes two linear and independent acoustic characteristics of speech so that cursor positioning may be done with any degree of resolution. Further, the acoustic characteristics utilized are selected such that the sounds required to attain a selected positioning of the cursor are easily predictable.

One acoustic characteristic which may be utilized as a candidate for cursor control is pitch. Most human beings can sustain a steady pitch or make the pitch of a vocal utterance rise and fall continuously over at least one octave. Pitch may be easily sustained regardless of vowel utterance, i.e., despite formant or frequency shifts. The continuity and independence of pitch makes this an excellent acoustic characteristic for the method and apparatus of the present invention.

Amplitude may also be continuously varied by most speakers; however, amplitude may vary as a function of pitch due to the speaker's vocal tract resonances and radiation characteristics and due to room acoustics. Further, high amplitude outputs will exhaust the speaker's breath more readily and perhaps disturb other users in the same physical location.

Therefore, the preferred embodiment of the present invention utilizes unvoiced speech utterances, such as the fricatives or sibilant qualities of speech. Unvoiced speech is physically created by turbulent airflow passing through a constricted portion of the vocal tract such as that formed by the tongue against the palate. The sibilants, such as the "S" sound, create a "noise cone" consisting of a band of random noise frequencies roughly centered about a "virtual" or "apparent" frequency. This noise cone is brought about when the white noise created by the turbulence of airflow in the vocal tract is regeneratively filtered by the tongue-teeth cavity and the teeth-lips cavity.

Control of the cavity resonances by a speaker by physically changing the shape of the vocal tract may be utilized to shift the virtual frequency of the noise output. This control of the virtual frequency of an unvoiced sibilant utterance is exercised in a manner such as whistling through one's teeth.

Those skilled in the art will appreciate that there are numerous advantages to utilizing the virtual frequency of an unvoiced utterance, such as sibilant speech, as an axis control input to complement pitch. In addition to the essential quality of being able to continuously vary the virtual frequency over a wide range, this acoustic characteristic is easily separable from pitch due to its non-repetitive nature and spectral separation. Sibilant quality is also entirely independent of pitch even in its creation.

Experimentation with the method and apparatus of the present invention has proven that an experienced user may create an unvoiced vocal utterance utilizing the "S" sound and thereby control movement of a cursor in one axis without affecting the other axis. Similarly, a user may hum a "M" sound, which is entirely devoid of sibilance, to control the pitch-associated axis only. Finally, an experienced user may utilize the "Z" sound to control both axes simultaneously.

Figure 2:
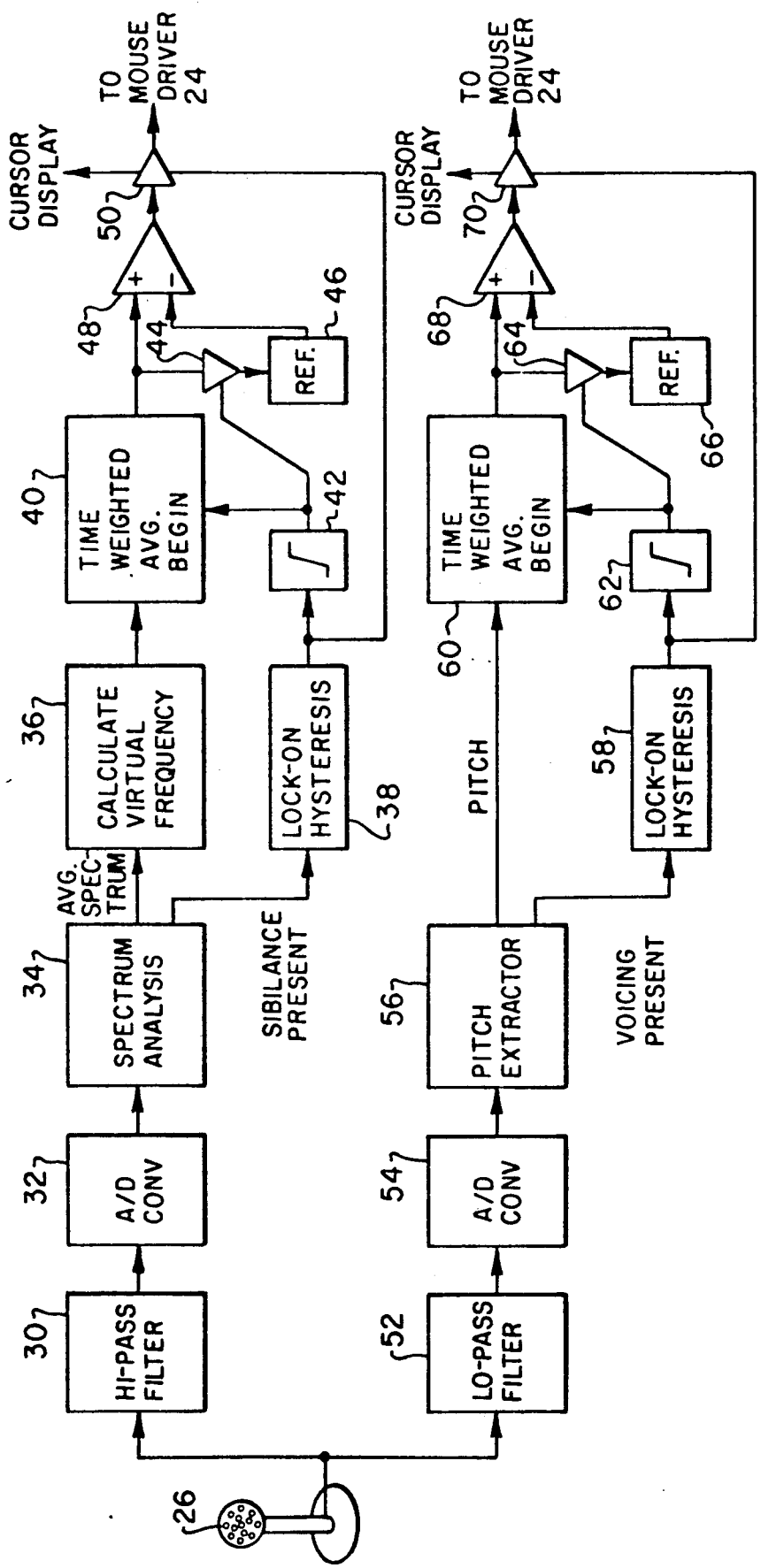
FIG. 2 is a schematic representation of the interface circuit of FIG. 1.

Referring now to FIG. 2, there is depicted a schematic representation of interface circuitry 28 of FIG. 1 which may be utilized to implement the method and apparatus of the present invention. As is illustrated, the output of microphone 26 is simultaneously coupled to high pass filter 30 and low pass filter 52. In the depicted embodiment of the present invention, high pass filter 30 and low pass filter 52 both have a cutoff frequency of approximately 500 hertz and serve to minimize cross talk effects between voiced speech utterances and unvoiced or sibilant voiced utterances.

First referring to high pass filter 30, the processing of an unvoiced or sibilant speech utterance may be illustrated. The output of high pass filter 30 is, in the depicted embodiment of the present invention, preferably coupled to analog-to-digital converter 32. Thereafter, this signal may be processed in the digital domain in any manner well known in the digital computer art. The output of analog-to-digital converter 32 is then coupled to spectrum analysis circuit 34.

Spectrum analysis circuit 34 preferably performs spectrum analysis on an unvoiced speech utterance by averaging multiple Fast Fourier Transforms. An indication of the presence of sibilant energy is also preferably generated by spectrum analysis circuit 34 and coupled to lock-on-hysteresis circuit 38 to denote the presence or absence of an unvoiced speech utterance. The output of spectrum analysis circuit 34, representing the average spectrum of an unvoiced speech utterance is then coupled to virtual frequency determination circuit 36. The virtual frequency of an unvoiced speech utterance is calculated from the averaged spectrum of an unvoiced utterance, by summing the levels within each frequency bin to derive an overall area under the spectrum. Thereafter, the spectra is convolved with a linear function and summed to provide a linearly convolved area which may be utilized to form a ratio with the simple area to provide a linear indicator of the center or virtual frequency of the unvoiced utterance.

The output of block 36, representing the center or virtual frequency of the unvoiced utterance is then coupled to time weighted averaging circuit 40. Time weighted averaging circuit 40 is utilized in conjunction with the presence of absence signal generated by lock-on hysteresis circuit 38 to provide smoother operation. The presence or absence indicators for both voiced and unvoiced speech preferably undergo hysteresis processing so that transient noises or dropouts do not generally cause control activation or deactivation.

The output of time weighted averaging circuit 40 is then amplified and coupled to output amplifier 50 for utilization as a control signal which may be coupled to mouse driver 24 (see FIG. 1) to control the movement of cursor 16 in a first axis. In the depicted embodiment of the present invention, a second output of amplifier 50 is preferably utilized to alter the graphic appearance of cursor 16 in a manner which will be depicted in greater detail herein. This graphic alteration of the appearance of cursor 16 may be utilized to readily indicate the presence of a valid control signal in one axis.

Referring back to low pass filter 52, the processing of a voiced utterance will be illustrated. As above, the output of low pass filter 52 is coupled to an analog-to-digital converter circuit 54. Thereafter, the digital signals generated thereby are processed in a manner familiar to those skilled in the digital computer art. The output of analog-to-digital converter 54 is preferably coupled to pitch extraction circuit 56. Pitch extraction circuit 56 may be implemented utilizing any pitch extraction circuit well known in the art; however, the depicted embodiment of the present invention may efficiently utilize an additive auto-correlation pitch extractor of the type well known in the art. As above, a presence or absence signal from pitch extractor circuit 56 is generated and coupled to lock-on hysteresis circuit 58 to be utilized in the manner described above to prevent the transitory nature of noise signals or dropouts from activating or deactivating a controlled signal.

Referring again to pitch extractor circuit 56, an output indicating the pitch of a voiced utterance is then coupled to timed weighted averaging circuit 60 to be processed in the manner described above with respect to an unvoiced utterance. As above, hysteresis processing of the presence or absence indication is utilized to ensure that a valid control signal is present. In the depicted embodiment of the present invention, a delay of approximately 100 milliseconds is utilized to qualify the presence or absence of a control signal.

Once an unvoiced control signal is deemed valid by enduring the qualification period, the output of the lock-on hysteresis circuit 38 becomes active whereupon a leading edge detector 42 recognizes the acquisition of lock-on condition and causes the time-weighted average circuit 40 to initialize to the value present at its input from block 36. The output of the leading edge detector 42 also activates a signal gate 44 to store the initial value output from averaging circuit 40 in a memory 46. Thereafter, all subsequent readings are compared by differential comparator 48 to the reference values stored in memory 46 to calculate a relative increase or decrease which has occurred since the beginning of an utterance. Thus, if the user initiates control and then increases sibilant virtual frequency, the velocity of the cursor will increase in a positive direction. Additionally, the output of lock-on hysteresis circuit 38 acts to enable output amplifier 50 so that signals are passed to the mouse driver only during a lock-on condition.

The same interaction described above applies to the initial lock-on of the voiced aspects of an utterance by the functions of the leading edge detector 60, signal gate 64, reference memory 66, differential comparator 68 and amplifier 70. Likewise, if the user initiates control and then increases pitch, the velocity of the cursor will increase in a positive direction along a determined axis.

In the depicted embodiment of the present invention, the motion of the cursor will persist as long as the elevated pitch is sustained. The motion of the cursor may be stopped by either returning to the initial pitch utilized to initiate the control utterance or by stopping the utterance altogether. Of course, those skilled in the art will appreciate that by lowering the pitch or virtual frequency of the control utterance to a value below this initial value the cursor may be caused to move in the opposite direction along a respective axis. As above, the output of amplifier 70 is preferably coupled to mouse driver 24 (see FIG. 1) to control the motion of cursor 16 in a second axis. Also, a second output of amplifier 70 may be utilized to graphically alter the appearance of cursor 16 in a manner which will be explained in greater detail herein.

Figures 3A, 3B, 3C:
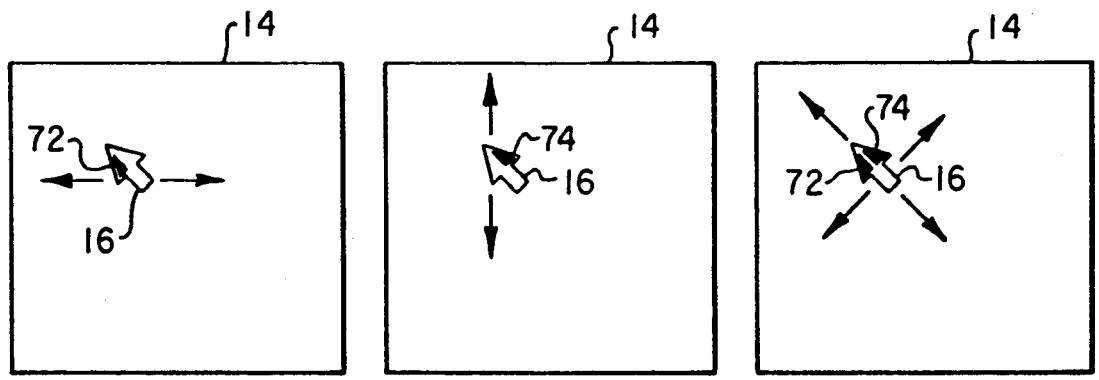
FIGS. 3a-3c are pictorial representations of a graphically altered cursor created in accordance with the method and apparatus of the present invention.

With reference now to FIGS. 3a-3c, there altered cursor 16 which have been created in accordance with the method and apparatus of the present invention. As is illustrated, in FIGS. 3a-3c a cursor 16 is depicted within display screen 14 of computer system 10 (see FIG. 1). Within FIG. 3a cursor 16 includes a darkened portion 72 in the left half of the arrowhead forming cursor 16. The presence of a darkened portion 72 in the left half of arrowhead 16, indicates, in the depicted embodiment of the present invention, the presence of a valid control signal in the horizontal axis. Thus, a user of computer system 10 attempting to verbally relocate cursor 16 may visually ascertain that a valid control signal has been verbally generated by referring to the display of cursor 16.

Of course, a second darkened area 74 may be utilized, as illustrated in FIG. 3b, to indicate the presence of a valid control signal in the vertical axis. In this manner, the user will be assured that he or she is accurately generating a proper verbal command to relocate cursor 16 in the vertical direction.

Finally, as illustrated in FIG. 3c, darkened portions 72 and 74 may be graphically depicted within cursor 16 in those cases in which an operator may simultaneously generate both a voiced and unvoiced control utterance causing cursor 16 to move in an oblique manner as illustrated in FIG. 3c.

Upon reference to the foregoing, those skilled in the art will appreciate that the applicant has provided a novel method whereby a cursor may be linearly controlled over fine movements utilizing vocal utterances. By utilizing selected linearly variable acoustic characteristics of these vocal utterances to linearly relocate cursor 16 within display screen 14 and by carefully selecting these acoustic characteristic such that a user may easily vary the characteristic linearly over a selected range, the method and apparatus of the present invention provides a technique whereby the location of cursor 16 within display screen 14 may be rapidly and accurately controlled.

While the invention has been particularly shown and described with reference to a preferred embodiment, it will be understood by those skilled in the art that various changes in form and detail may be made therein without departing from the spirit and scope of the invention.

I claim:

1. A method in a computer system including a display screen having a cursor displayed at a selected position therein, for linear vocal control of fine cursor movement, said method comprising the steps of:
   detecting a vocal utterance;
   determining at least one linearly variable acoustic characteristic of said vocal utterance; and
   linearly varying the position of said cursor in response to variations in said at least one acoustic characteristic.

2. The method in a computer system including a display screen having a cursor displayed at a selected position therein, for linear vocal control of fine cursor movement according to claim 1, wherein said step of determining at least one linearly variable acoustic characteristic comprises the step of determining the pitch of said vocal utterance.

3. The method in a computer system including a display screen having a cursor displayed at a selected position therein, for linear vocal control of fine cursor movement according to claim 1, further including the step of providing a graphic indication within said display screen of the detection of said vocal utterance.

4. The method in a computer system including a display screen having a cursor displayed at a selected position therein, for linear vocal control of fine cursor movement according to claim 3, wherein said step of providing a graphic indication within said display screen of the detection of said vocal utterance comprises the step of graphically altering the appearance of said cursor.

5. The method in a computer system including a display screen having a cursor displayed at a selected position therein, for linear vocal control of fine cursor movement according to claim 1, wherein said step of determining at least one linearly variable acoustic characteristic of said vocal utterance comprises the step of determining a first linearly variable acoustic characteristic and a second linearly variable acoustic characteristic of said vocal utterance and wherein the position of said cursor is varied linearly in a first axis in response to variations in said first acoustic characteristics and varied linearly in a second axis in response to variations in said second acoustic characteristic.

6. The method in a computer system including a display screen having a cursor displayed at a selected position therein, for linear vocal control of fine cursor movement according to claim 5, wherein said step of determining said second linearly variable acoustic characteristic comprises the step of determining the virtual frequency of an unvoiced vocal utterance.

7. An apparatus for linear vocal control of cursor position in a computer display system having a cursor displayed at a selected position therein, said apparatus comprising:

acoustic input means for detecting a vocal utterance;
utterance analysis means coupled to said acoustic input means for determining at least one linearly variable acoustic characteristic of said vocal utterance; and
cursor position means coupled to said utterance analysis means for linearly varying the position of said cursor in response to variations in said at least one acoustic characteristic.

8. The apparatus for linear vocal control of cursor position in a computer display system having a cursor displayed therein according to claim 7, wherein said at least one linearly variable acoustic characteristic comprises pitch.

9. The apparatus for linear vocal control of cursor position in a computer display system having a cursor displayed therein according to claim 7, wherein said acoustic input means comprises a microphone.

10. The apparatus for linear vocal control of cursor position in a computer display system having a cursor displayed therein according to claim 7, wherein said utterance analysis means comprises means for detecting voiced vocal utterances and unvoiced vocal utterances.

11. The apparatus for linear vocal control of cursor position in a computer display system having a cursor displayed therein according to claim 10, wherein said utterance analysis means includes means for determining the pitch of a voiced vocal utterance and wherein said cursor position means linearly varies the position of said cursor in a first axis in response to variations in said pitch.

12. The apparatus for linear vocal control of cursor position in a computer display system having a cursor displayed therein according to claim 11, wherein said utterance analysis means includes means for determining the virtual frequency of an unvoiced vocal utterance and wherein said cursor position means linearly varies the position of said cursor in a second axis in response to variations in said virtual frequency.

* * * * *